April 17, 1962     Z. M. ROEHR     3,029,815
NEEDLE WITH PLASTIC HUB
Filed July 25, 1957     2 Sheets-Sheet 1
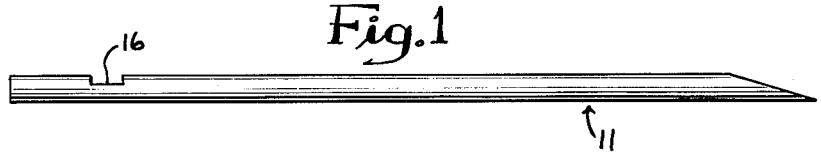
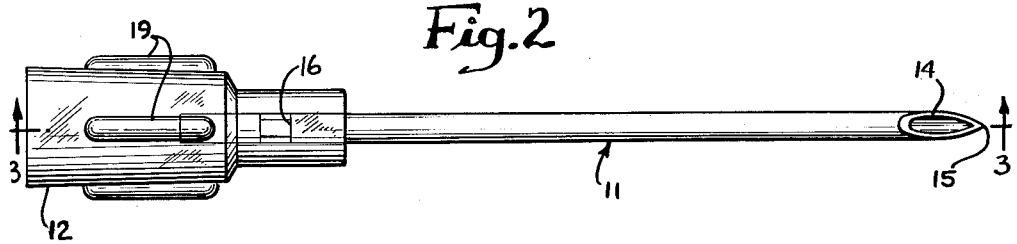
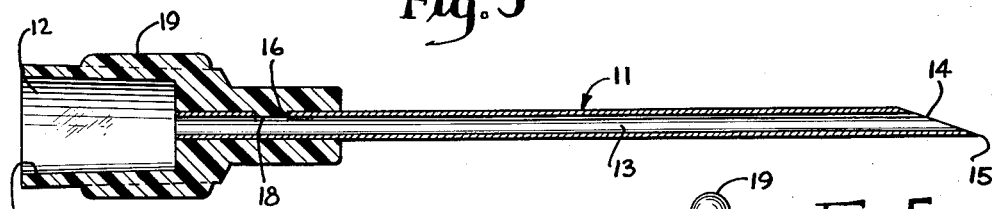
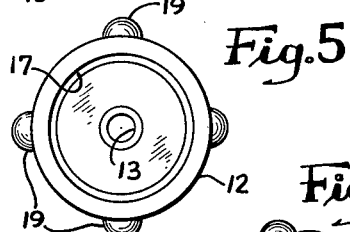
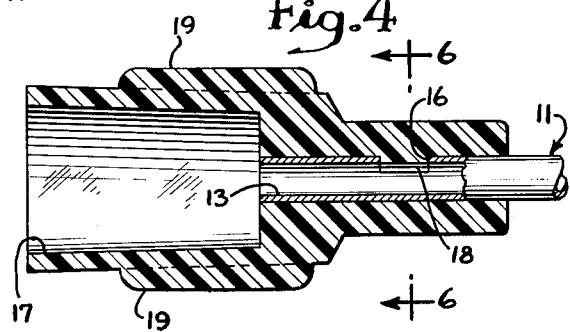
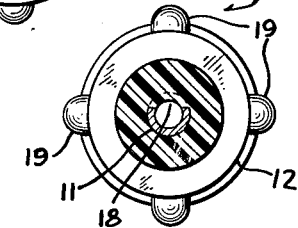
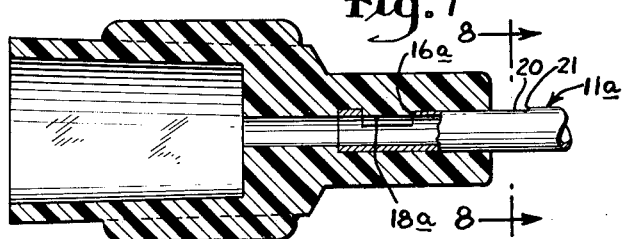
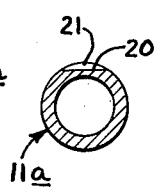
INVENTOR
ZBISLAW M. ROEHR
by: Morris Spector
ATTY.

April 17, 1962   Z. M. ROEHR   3,029,815
NEEDLE WITH PLASTIC HUB

Filed July 25, 1957   2 Sheets-Sheet 2

INVENTOR
ZBISLAW M. ROEHR
by: Morris Spector
ATTY.

United States Patent Office 3,029,815
Patented Apr. 17, 1962

3,029,815
NEEDLE WITH PLASTIC HUB
Zbislaw M. Roehr, Deland, Fla., assignor, by mesne assignments, to Brunswick Corporation, Chicago, Ill., a corporation of Delaware
Filed July 25, 1957, Ser. No. 674,221
2 Claims. (Cl. 128—221)

This invention relates to needles variously used in surgery, particularly of the type wherein the needle includes a canula secured to a molded hub.

Needles of this character comprise a very small diameter elongated and sharp pointed canula secured to a hub or ferrule. In the production of needles of this type, it is necessary so to anchor the canula to the hub as to insure against all possible accidental alteration of their axial relationship.

The primary problem encountered in molding plastics about a tubular insert is to obtain a grip so that the plastic will not separate from the insert when in use. In the manufacture of hypodermic needles with plastic hubs, it is particularly important to obtain a very firm and permanent grip between the canula and the hub. Some have even proposed inserting the canula into a previously molded hub, and form a compression fit therebetween to maintain the required grip. Those methods that have heretofore been used, to the applicant's knowledge, with varying degrees of success, all have limitations as to the type of plastic which can be used and mechanical limitations as to their effectiveness.

The main objects of this invention are to provide an improved manner of anchoring to each other the canula and hub of a surgical needle; to provide an improved manner of anchoring the canula and hub of a surgical needle which permits the hub to be molded plastic; to provide an improved canula-hub anchoring which is economical to produce and which precludes reasonable possibility of an accidental alteration of their relationship; and to provide an improved canula-hub anchoring of this kind wherein the anchor of the canula is so correlated with the tapered open end of the canula and is visible through the hub, thereby indicating the angular orientation of the tapered canula end.

The above objects of the present invention are attained, in the preferred embodiments herein illustrated, by providing one or more openings in the side wall of the tubing constituting the canula at the end of the tubing that is to be covered with plastic. The plastic is molded around the end of the tubing in such a manner that during the molding operation the plastic flows into the opening but is prevented from filling the interior of the tube. After the molding operation all of the plastic solidifies. The portion of the plastic that extends through the side wall of the tube acts as a key locking the hub and the canula together, which key will have to be sheared off before separation of the tube or canula from the plastic hub is possible.

A problem often faced by physicians in making hypodermic injections is that it is necessary to determine the orientation of the needle bevel after the same has been inserted into the flesh. By making the previously referred to opening in the side wall of the canula in the form of a slot which is in the same radial plane with the major axis of the bevel of the needle, and by molding the hub from a transparent (or even translucent) plastic, the physician can determine the orientation of the needle bevel by observing the corresponding orientation of the slot in the canula through a transparent or translucent hub.

The attainment of the above and further objects of the present invention will be apparent from the following specification taken in conjunction with the accompanying drawings forming a part thereof.

In the drawings:

FIG. 1 is an enlarged side view of a canula constructed in accordance with this invention, before anchoring in a plastic hub;

FIG. 2 is an enlarged side view of the assembled canula and hub;

FIG. 3 is a longitudinal sectional view of the same;

FIG. 4 is a further enlarged, longitudinal, sectional view of the hub and the embedded end of the canula;

FIG. 5 is a left hand end view of FIG. 4;

FIG. 6 is a sectional view taken along the line 6—6 of FIG. 4 and looking in the direction of the arrow;

FIG. 7 is a view similar to FIG. 4 but showing a modified construction;

FIG. 8 is a sectional view taken along the line 8—8 of FIG. 7;

FIGS. 9a through 19a are, respectively, fragmentary side views of different modifications of canulae corresponding to the canula of FIG. 1;

FIGS. 9b through 19b are, respectively, end views of the corresponding canulae of FIGS. 9a through 19a, in each instance the figure number with the b subscript being an end view of the figure having the same numeral with an a subscript.

In the accompanying drawings like reference numerals designate like parts throughout:

One essential concept of this invention involve a canula with a peripheral recess, embedded in a plastic hub and keyed to the hub by the entrance of the plastic into the recess to preclude accidental alteration of their relationship.

A needle embodying the foregoing concept comprises a canula 11 and a hub 12 assembled to permit use thereof as an accessory to varying types of instrument either for the administration of substances to a patient or for the extraction of a fluid from a patient.

The canula 11 is conventionally formed of a long, slender, small diameter tube usually of high grade stainless steel, with a lumen 13 extending the full length thereof. The administering end of the canula 11 is tapered at 14, in the usual manner, to form a penetrating point 15. Inwardly from the opposite blunt end the canula has a peripheral section cut out to form a recess 16 extending axially and circumferentially and opening outwardly in the same direction as the taper 14. The recess 16 is positioned inwardly from the blunt end a distance such that the recess is exposed to view through the stem of the hub 12, namely, at a point of the smaller diameter of the hub.

The hub 12 is plastic, for instance, cellulose acetate, anchored to the blunt end of the canula. The larger portion of the hub 12 is formed with a tapered socket or cavity 17 into which is adapted to be telescoped the end of a tube or syringe, for instance, of the Luer type, or other instrument which requires a needle of this kind for its appropriate use. The taper of the socket 17 is a standard Luer taper, that is a taper of 0.060 inch per inch. In one construction the inside diameter of the socket 17 was .169 inch at its outer end and .154 inch at an axial distance of .250 inch from the outer end. These dimensions are given merely by way of illustration, it being understood that the invention is not limited thereto. The remaining portion of the hub 12 is solid and embraces the blunt end of the canula 11. A portion of the plastic extends into the recess 16 and forms a key 18 whereby the canula and hub are so anchored together as to preclude reasonable possibility of an accidental axial or circumferential alteration of their relationship, notwithstanding the uses to which the needle may be subjected. The inner end of the plastic key 18 terminates flush with and is a continuation of the cylindrical inner surface of the canula and forms a smooth continuous part of the lumen, as may be seen from FIGURE 6. Hub ribs 19 are optional.

When the hub 12 is a transparent plastic, which is preferred, the recess 16 is visible through the hub. The recess 16 opening outwardly in the same direction as the taper 14, makes it possible for the user of such a needle to determine the disposition of the tapered end though hidden from view. In addition, in some uses of the needle the user may observe the existence of flow of liquid through the needle by observation through the transparent hub and the opening 16.

In the embodiment of the invention here shown the canula is firmly anchored in the hub, being held by the entrance of molded plastic or key 18 against both rotary and axial movement. Because the plastic is transparent the operator using the needle can tell, by looking at the hub, the direction of the tapered end 14. This is often important in instances wherein the tapered end after it has been positioned in the flesh, must retain that position against rotary motion even though the tapered end is no longer in view.

In FIGURES 7 and 8 there is shown another embodiment of the present invention wherein the means for indicating the orientation of the beveled end of the canula may extend or be located outside of the hub so that the transparency of the hub is not required for the purpose of determining orientation of the beveled end of the needle. In this embodiment the canula is indicated at 11a, being a stainless steel tube as previously described, and has a recess 16a therein that corresponds to the recess 16 of FIGURE 1 but may be somewhat deeper than that recess. In addition, the outer wall surface of the canula 11a is slabbed off to provide a flat 20. This flat extends from out of the hub to a point 21 which is located a sufficient distance outside of the plastic hub 12 to be clearly visible. This flat is oriented with respect to the tapered end 14 of the canula so that by observing the exposed flat surface 20 one knows the orientation of the tapered end 14.

In the embodiments illustrated in FIGS. 9a through 19a, only the anchoring end of the canula is shown. The rest of the canula is in each instance of a construction substantially the same as the canula 11 of FIG. 1, being formed of a long, slender, small diameter tube of stainless steel or the like, having a lumen therethrough like the lumen 13 of the embodiment of FIGS. 1, 2 and 3, and having a beveled penetrating point at one end and the opposite end, which is the end shown in FIGS. 9a through 19a, being adapted to have a hub molded therearound like the hub 12. The differences between the ends of the canulae of FIGS. 9a through 19a and that of FIG. 4 being in the manner of locking the hub to the respective canulae, it being understood that each canula of FIGS. 9a through 19a is to have a hub molded thereon at the end illustrated, as heretofore described, the hub in each case being, preferably a transparent plastic as set forth.

The canula of FIGS. 9a and 9b differs from that of FIG. 1 in that here the recess 16c that corresponds to the recess 16 of FIG. 1 extends through an arc of 180°.

In the embodiment illustrated in FIGS. 10a and 10b the recess 16d extends through an arc greater than 180° and, in addition, the end 30 of the canula has been cut away down to the line 31.

In the embodiment illustrated in FIGS. 11a and 11b the slot 16e, that corresponds to the slot 16, is a V-shaped slot having a tip 32 above the trough 33.

The embodiment illustrated in FIGS. 12a and 12b differs essentially from that illustrated in FIGS. 9a and 9b or from that illustrated in FIG. 1 only in that here the slot 16f is deeper than is the slot 16 or 16c in the embodiments heretofore described, the slot 16f in this instance extending over an arcuate extent greater than 180°, or a depth of slot going past the center of the canula.

In the embodiment illustrated in FIGS. 13a and 13b the corners of the slot 16f, which correspond to the slot of FIG. 12a, have been rounded as indicated at 35—35.

In the canula illustrated in FIGS. 14a and 14b the anchoring means is provided by forming a hole 16g in the end of the canula, said hole functioning in the same manner as does the slot 16 in the embodiment of FIG. 1.

The embodiment illustrated in FIGS. 15a and 15b is similar to that of FIGS. 10a and 10b except that here, in addition, the ends 40 formed by removal of canula material at 30, are outwardly flared at 41—41 to facilitate anchoring of the end of the canula within the hub that is to be molded therearound.

The embodiment illustrated in FIGS. 16a and 16b is the same as that illustrated in FIGS. 11a and 11b except that the structure of FIGS. 11a and 11b is further modified by outwardly flaring the ends 32 of FIG. 11a as indicated at 42 in FIG. 16b.

In the embodiment illustrated in FIGS. 17a and 17b slots 16h, 180° apart, extend axially to the end 44 of the canula. Each slot 16h may be straight in a longitudinal direction or tapered to form a dovetail opening as illustrated in FIGS. 17a and 17b.

The embodiment illustrated in FIGS. 17a and 17b may be further modified as illustrated in FIGS. 18a and 18b by opening each slot, as for instance by flaring the metal of the canula outwardly to form each into a V-shaped slot 16k.

In the embodiment illustrated in FIGS. 19a and 19b there is shown a cannula having two or more slots 16m—16m. These slots may extend to a depth of 180°, or more than 180°, or less than 180°, as in FIGS. 1, 9a and 12a, the slot 16m being narrower in an axial direction than those slots. Likewise the slots 16m may be rounded at their bottoms as indicated at 35 in FIG. 13a.

In compliance with the requirements of the patent statutes, I have here shown a number of preferred embodiments of the present invention illustrating the principles thereof, it being understood that the invention is not limited to these precise embodiments, the same being merely illustrative of the principles of the invention.

What is considered new and sought to be secured by Letters Patent is:

1. A hypodermic needle comprising; a light-impervious hypodermic needle cannula having a tubular wall defining an axial lumen provided with a tapering surface means defining a penetrating point on at least one end, said cannula having a part of the wall thereof spaced axially from said point removed to form a recess which extends through said cannula wall and provides an opening into the interior of said lumen, a light-pervious plastic hub secured to said cannula and sealably enclosing said recess with a section of said hub filling said recess with light-pervious plastic to form a key anchoring said hub to said cannula and preventing axial and circumferential movement of said hub relative to said cannula, and said recess filled with light-pervious plastic being in circumferential alignment with said tapering surface means to indicate the angular orientation of said penetrating point and to provide a means for immediately observing the flow of a fluid through the lumen of said cannula.

2. A hypodermic needle comprising; a light-impervious hypodermic needle cannula having a tubular wall defining an axial lumen provided with a tapering surface means defining a penetrating point on one end of said cannula, said tapering surface means facing outwardly in one general circumferential direction, said cannula having a part of the wall thereof spaced axially from said penetrating point removed to form a recess which extends through said cannula wall and provides an opening into the interior of said lumen, a light-pervious plastic hub secured to said cannula and sealably enclosing said recess with a section of said hub filling said recess with light-pervious plastic to form a key anchoring said hub to said cannula and preventing axial and circumferential movement of said hub relative to said cannula, and said recess filled with light-pervious plastic being in circumferential alignment with said tapering surface means to indicate the angular orientation of said penetrating point when said penetrating point is invisible.

References Cited in the file of this patent

UNITED STATES PATENTS

| | | |
|---|---|---|
| 1,728,619 | Lambert | Sept. 17, 1929 |
| 2,512,568 | Saffir | June 20, 1950 |
| 2,693,183 | Lockhart | Nov. 2, 1954 |

FOREIGN PATENTS

| | | |
|---|---|---|
| 190,388 | Great Britain | Dec. 21, 1922 |
| 507,003 | Great Britain | June 7, 1939 |
| 1,004,651 | France | Nov. 28, 1951 |